US012768434B2

(12) United States Patent
Scholle et al.

(10) Patent No.: US 12,768,434 B2
(45) Date of Patent: Oct. 20, 2026

(54) VEHICLE AXLE FOR A TWO-TRACK VEHICLE

(71) Applicant: AUDI AG, Ingolstadt (DE)

(72) Inventors: Tassilo Scholle, Gaimersheim (DE); Alfred Rehr, Hepberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 19/262,747

(22) Filed: Jul. 8, 2025

(65) Prior Publication Data

US 2026/0016076 A1 Jan. 15, 2026

(30) Foreign Application Priority Data

Jul. 9, 2024 (DE) ..................... 10 2024 119 453.7

(51) Int. Cl.

| | |
|---|---|
| ***F16H 48/36*** | (2012.01) |
| ***B60K 17/02*** | (2006.01) |
| ***B60K 17/04*** | (2006.01) |
| ***B60K 17/16*** | (2006.01) |
| ***F16H 37/08*** | (2006.01) |

(Continued)

(52) U.S. Cl.

CPC ............ *F16H 48/36* (2013.01); *B60K 17/02* (2013.01); *B60K 17/046* (2013.01); *B60K 17/165* (2013.01); *F16H 37/082* (2013.01); *F16H 57/02* (2013.01); *F16H 57/0473* (2013.01); *B60T 1/062* (2013.01); *F16H 2048/364* (2013.01);

(Continued)

(58) Field of Classification Search

CPC ........ F16H 48/36; F16H 37/082; F16H 57/02; F16H 57/0473; F16H 2048/364; F16H 2048/368; F16H 2057/02034; F16H 2057/02052; B60K 17/02; B60K 17/046; B60K 17/165; B60T 1/062

See application file for complete search history.

(56) References Cited

U.S. PATENT DOCUMENTS 5,868,642 A * 2/1999 Kobayashi ......... B60K 17/3462 475/203
7,211,019 B2 5/2007 Kirkwood et al.

(Continued)

FOREIGN PATENT DOCUMENTS

DE 10219920 A1 11/2003
DE 10342164 A1 4/2005

(Continued)

*Primary Examiner* — Toan C To

(74) *Attorney, Agent, or Firm* — Seed Intellectual Property Law Group LLP

(57) ABSTRACT

A vehicle axle for a two-track vehicle is disclosed, and may include an axle differential having an input side and two output sides and at least two superposition gears for torque vectoring. The input side may be drivingly connected to a drive unit. The two output sides may each include a drive flange shaft leading to a respective vehicle wheel. Each of the at least two superposition gears may have a multi-plate brake or clutch. Each multi-plate brake or clutch may have an actuator. Each actuator may be a pressure mechanism and may be configured as a pair of disks comprising a rotationally fixed disk and a coaxially rotatable disk. Each drive flange shaft may be configured to interact with a respective superposition gear. The rotationally fixed disk of each actuator may form a gear carrier on which at least one gear is rotatably mounted.

19 Claims, 5 Drawing Sheets

(51) Int. Cl.
*F16H 57/02* (2012.01)
*F16H 57/04* (2010.01)
*B60T 1/06* (2006.01)

(52) U.S. Cl.
CPC .................. *F16H 2048/368* (2013.01); *F16H 2057/02034* (2013.01); *F16H 2057/02052* (2013.01)

(56) References Cited

U.S. PATENT DOCUMENTS

| | | | | |
|---|---|---|---|---|
| 7,464,626 | B2 * | 12/2008 | Yamazaki | B60K 17/344 74/606 R |
| 10,851,843 | B2 * | 12/2020 | Shibata | F16H 48/30 |
| 11,174,928 | B2 * | 11/2021 | Fukuda | F16H 48/285 |
| 11,428,302 | B1 * | 8/2022 | Bittlingmaier | B60T 1/062 |
| 2018/0216672 | A1 * | 8/2018 | Putzer | F16D 28/00 |
| 2018/0223976 | A1 * | 8/2018 | Fujii | F16D 25/082 |
| 2019/0376565 | A1 * | 12/2019 | Oyabu | F16D 21/06 |
| 2020/0292045 | A1 * | 9/2020 | Fukuda | F16H 48/145 |
| 2020/0325987 | A1 * | 10/2020 | Nishimoto | B60K 5/04 |
| 2021/0053435 | A1 * | 2/2021 | Ito | B60K 6/52 |
| 2024/0288036 | A1 * | 8/2024 | Thomaser | F16D 13/648 |

FOREIGN PATENT DOCUMENTS

| | | | |
|---|---|---|---|
| DE | 102005061267 | A1 | 6/2007 |
| DE | 102006025061 | A1 | 12/2007 |
| DE | 102017208433 | B3 | 8/2018 |
| DE | 102017210792 | A1 | 12/2018 |
| DE | 102017210972 | A1 | 1/2019 |
| JP | 2014001750 | A | 1/2014 |

* cited by examiner

VEHICLE AXLE FOR A TWO-TRACK VEHICLE

BACKGROUND

Technical Field

The present disclosure relates to a vehicle axle for a two-track vehicle, more specifically an electrified vehicle rear axle.

Description of the Related Art

A generic two-track vehicle has a vehicle axle with a drive/brake module, the axle differential of which provides a 50/50 torque distribution to the two vehicle wheels. The input side of the axle differential is drivingly connected to a drive unit (e.g., an electric motor), while its output sides drive flange shafts that lead to the vehicle wheels.

Such a drive/brake module can be designed with a mechanical torque vectoring system, in which a superposition gear is associated with each side of the vehicle. By way of these superposition gears, the drive unit can drive directly the respective flange shaft, bypassing the axle differential. A multi-plate clutch with an electrically controllable actuator is installed in each of the two superposition gears. Controlling the actuator results in torque superposition and associated vehicle dynamics control during propulsion or braking.

The vehicle axle, consisting of the axle differential and the two superposition gears, results in a structural component-intensive design and packaging problems due to the high installation space requirements of the components installed in the vehicle axle. In order to reduce the installation space required in the axial direction, the respective actuator of the multi-plate clutch in the generic vehicle axle is designed as a pair of disks consisting of a rotationally fixed disk and a coaxial rotatable disk that saves installation space in the axial direction. At least one ball-ramp unit, in which a ball rolls between mutually inclined ball tracks of the pair of disks is active between the two disks. Depending on the direction of rotation of the rotatable disk, an axial spreading of the pair of disks is built up/reduced over an axial spreading distance in order to apply contact pressure to the multi-plate clutch or to relieve it of this pressure.

DE102017208433B3 discloses a transfer gearbox device for a motor vehicle, comprising a differential gear with at least one crown wheel in a first oil chamber and a friction clutch in a second oil chamber. The first oil chamber has a first oil sump, while the second oil chamber has a second oil sump. A valve is arranged between the first oil chamber and the second oil chamber, so that when the valve is open, oil can pass, via the valve, out of the first oil chamber into the second oil chamber and, when the valve is closed, oil cannot pass, via the valve, out of the first oil chamber into the second oil chamber.

DE10219920A1 discloses a drive with an integrated brake for electric motor-driven vehicles, with a single-wheel drive for each of the two drive wheels, wherein each single-wheel drive comprises a coaxially arranged motor, a transmission, and a braking device with an actuator. The actuator is designed as a ball-ramp actuator, the stationary disk of which simultaneously forms the A-end shield for the motor.

DE102017210972A1 discloses a transmission arrangement with at least one shifting element for realizing gear ratios, wherein an actuator system is associated with the shifting element, and wherein an electromechanical actuator system is provided which comprises a ball ramp mechanism for generating an actuating movement.

BRIEF SUMMARY

The present disclosure provides a vehicle axle for a two-track vehicle which, compared to the prior art, has a reduced structural component complexity and a reduced installation space requirement.

The present disclosure relates to a vehicle axle for a two-track vehicle having an axle differential. Its input side may be drivingly connected to a drive unit, while its two output sides drive flange shafts, which lead to one vehicle wheel on each side of the vehicle. Each flange shaft may be associated with a superposition gear for torque vectoring. The drive unit may be drivingly connected directly to the respective flange shaft with the respective superposition gear, bypassing the axle differential. A multi-plate brake or clutch with an electrically controllable actuator may be installed in each of the two superposition gears. This actuator may apply contact pressure to the multi-plate brake or clutch for torque superposition and associated vehicle dynamics control (torque redistribution on the vehicle axle). For this purpose, the actuator may be configured with a contact pressure mechanism in the form of a pair of disks, one disk being a stationary or rotationally fixed disk and one being a coaxially rotatable disk.

When viewed in the vehicle transverse direction, the axle differential may be positioned approximately centrally in the vehicle axle, with the vehicle axle being configured mirror-symmetrically with respect to a central longitudinal plane of the vehicle. As a result, one superposition gear with a multi-plate brake or clutch and an actuator may be positioned on each of the two sides of the vehicle. The components of the vehicle axle may result in a structural component-intensive design and packaging problems due to the high installation space requirements of the components. In order to reduce the installation space requirements in the axial direction, the actuator of the respective multi-plate brake or clutch, according to the present disclosure, may be implemented as a pair of disks with a short axial design.

To further reduce the installation space requirement and the structural component complexity, according to the present disclosure, the rotationally fixed disk of the actuator may be configured with at least one additional function, thereby reducing the installation space and structural component requirements of the vehicle axle. Specifically, in a dual function, the rotationally fixed disk of the actuator additionally may form a gear carrier, on which at least one gear of the superposition gear is mounted. With regard to an embodiment with compact design in the axial direction, the superposition gear may be configured as a planetary gear. In this case, the rotationally fixed disk of the actuator may form a planetary gear carrier, on which at least one planetary gear of the superposition gear is rotatably mounted.

In a technical implementation, the axis of rotation of the gear can be defined by a support bolt, one end of which may be attached to the rotationally fixed disk of the actuator. The other bolt end of the support bolt may, with regard to stable mounting, be attached to an end shield that is axially spaced from the rotationally fixed disk and which is also fixedly installed in the vehicle axle (i.e., in a rotationally fixed or stationary manner).

In some embodiments, the superposition gearing may have the following components: in the vehicle transverse direction, a vehicle-external sun gear which is seated, as a loose gear wheel, on the respective flange shaft; in the vehicle transverse direction, a vehicle-internal sun gear which is seated in a rotationally fixed manner on an output-side hub section of a differential housing of the axle differential, through which the flange shaft extends; and the support bolt mentioned above, on which a planetary gear meshing with the vehicle-internal sun gear and a planetary gear meshing with the vehicle-external sun gear are rotatably mounted. In an installation space-saving design variant the two planetary gears may be joined together to form a double planetary gear, for example by welding. In this case, the vehicle-external sun gear, designed as a loose gear wheel, may be coupled to the flange shaft via the multi-plate brake or clutch in a torque-transmitting manner.

When viewed in the vehicle transverse direction, the components of the vehicle axles may be positioned as follows: the double planetary gear rotatably mounted on the support bolt may be positioned inside the vehicle and the multi-plate brake or clutch may be positioned outside the vehicle. In this case, the actuator with the pair of disks may be arranged, in the vehicle transverse direction, axially between the double planetary gear and the multi-plate brake or clutch.

With regard to a compact arrangement, all components of the vehicle axle, i.e., the axle differential and the two superposition gears, may be arranged in a vehicle axle housing. In the same way, the components of the superposition gear, i.e., in particular its sun and planetary gears, may be positioned in a gear housing of the superposition gear. In a variant with fewer structural components, the gear housing may be constructed directly from the rotationally fixed disk and the end shield. When viewed in the axial direction (i.e., in the vehicle transverse direction), the rotationally fixed disk and the end shield may be clamped together, for example, via a screw connection, and define a housing interior within which the sun and planetary gears are positioned in a compact manner.

The end shield may be fixedly attached to the outer vehicle axle housing; in the same way, the rotationally fixed disk of the actuator may also be fixedly attached to the vehicle axle housing (e.g., by screwing).

In some embodiments configured for space-saving, the end shield may also form a pivot bearing point for the hub section of the axle differential in a dual-function. At such a pivot bearing point, the axle differential hub section may be mounted in a bearing opening of the end shield with the interposition of a pivot bearing.

At least one ball-ramp unit may be formed between the rotationally fixed disk and the coaxially rotatable disk of the actuator. In the ball-ramp unit, a ball may roll between mutually inclined ball tracks of the pair of disks. Depending on the direction of rotation of the rotatable disk, an axial spreading of the pair of disks may be built up or reduced along an axial spreading distance in order to apply contact pressure to the multi-plate brake or clutch or to relieve the multi-plate brake or clutch of this pressure.

The rotationally fixed disk provided with extended functionality may be configured such that the rotatable disk can have a radially outer ring, which is part of the ball-ramp unit. The radially outer ring may transition radially inward into a housing cover to which the support bolt is attached. Furthermore, the housing cover of the rotationally fixed disk may be attached to the end shield, for example, by way of a screw connection.

A preferred gear structure for the respective superposition gear may be configured such that the vehicle-external sun gear can be seated in a rotationally fixed manner on a sun gear hollow shaft, through which the flange shaft is guided. The sun gear hollow shaft may have a radially expanded coupling flange with a plate carrier. In the same way, the flange shaft may also be provided with a radially expanded coupling flange with a plate carrier. A clutch pack of the multi-plate brake or clutch may be arranged between the plate carriers of the two coupling flanges. The clutch pack, in turn, may be subjected to or relieved of contact pressure using the rotatable disk of the actuator.

In some embodiments, the two coupling flanges may be supported in the axial direction, directly or indirectly, on the rotationally fixed disk of the actuator, thereby saving installation space in the axial direction. By way of example, the rotationally fixed disk may have a rolling element raceway, which is part of an axial support bearing, by way of which one of the two coupling flanges is supported directly on the rotationally fixed disk. The other coupling flange may be axially supported directly on the coupling flange near the disk via another axial support bearing.

In some embodiments, the multi-plate brake or clutch may be implemented as a wet-running system, so that the clutch pack is arranged in a coolant circuit of the vehicle axle. To reduce the number of structural components in the arrangement, separate coolant hoses may be omitted. Instead, according to the present disclosure, a coolant channel may extend both through the end shield and through the rotationally fixed disk of the actuator, crossing a joining surface between the end shield and the rotationally fixed disk. The coolant channel may open directly into a distribution chamber formed radially within the clutch pack of the multi-plate brake or clutch. During vehicle operation, the coolant may be displaced by centrifugal force from the radially inner distribution chamber through the clutch pack to the outside in the radial direction, and from there, for example, flow into a coolant sump.

The present disclosure is described below by way of an exemplary embodiment.

DETAILED DESCRIPTION

Figure 1:
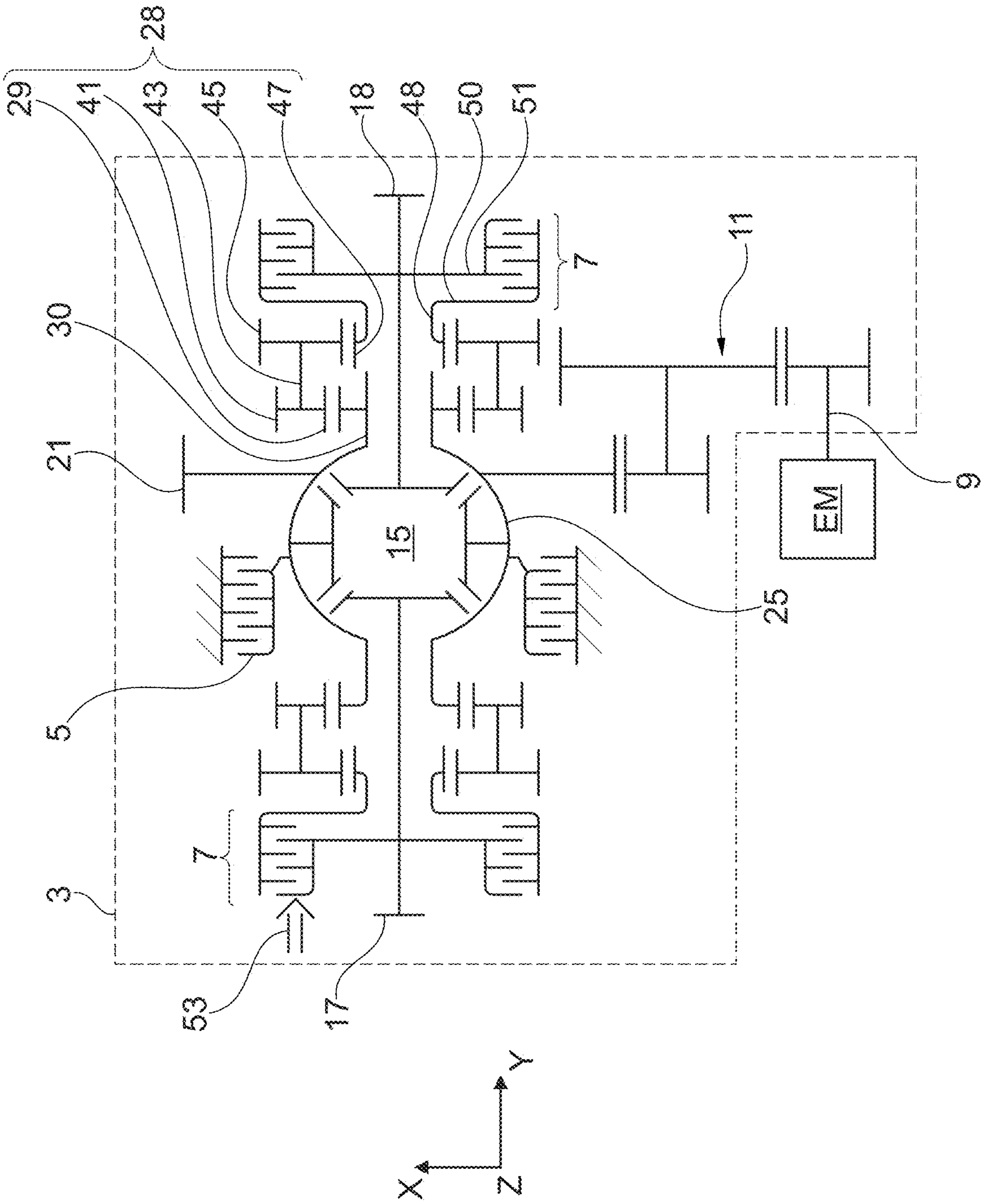
FIG. 1 shows a schematic representation according to one embodiment of an electrified vehicle rear axle having a drive/brake module.

FIG. 1 shows an electrified vehicle rear axle having a drive/brake module. The vehicle axle has an electric machine EM and a vehicle axle housing 3, in which superposition gears 28, an axle differential 15, and a central multi-plate brake 5 are arranged. Electric machine EM is connected to a high-voltage battery (not shown). Conventional vehicle wheel brakes are omitted from the vehicle rear axle. Instead of such conventional vehicle wheel brakes, the vehicle axle may have the central multi-plate brake 5 and multi-plate clutches 7, in which the superposition gear 28 is installed. Central multi-plate brake 5 may cause vehicle braking.

Electric machine EM may be connected to the input side of an axle differential 15 via its rotor shaft 9 with the interposition of an intermediate gear stage 11. The output sides of said axle differential may be in driving connection with the vehicle rear wheels. In FIG. 1, electric machine EM is installed transversely in the vehicle axle. Accordingly, rotor shaft 9 and flange shafts 17, 18 may be axially parallel to one another, leading from the output sides of axle differential 15 to the vehicle rear wheels. Likewise, multi-plate clutches 7 and multi-plate brake 5 installed in the vehicle axle may be aligned axially parallel to one another in the vehicle transverse direction Y.

When viewed in the vehicle transverse direction Y, the vehicle axle may have one of superposition gears 28 on each side of the vehicle, with which electric machine EM can be directly connected to one of flange shafts 17, 18, bypassing axle differential 15. By way of the two superposition gears 28, the electric machine EM may therefore drive directly the vehicle wheels via load paths, bypassing axle differential 15, in order to carry out mechanical torque vectoring.

Intermediate gear stage 11 may be in driving connection with an input-side axle differential gear 21. Axle differential gear 21 may be attached in a rotationally fixed manner to a rotating differential housing 25. According to FIG. 1, axle differential 15 may drive two flange shafts 17, 18 leading to the vehicle wheels in vehicle transverse direction y in a 50/50 distribution on both sides.

The vehicle axle may be configured to be mirrored symmetrically with respect to a central longitudinal plane of the vehicle passing through axle differential 15. Each of the two superposition gears 28 may be configured as a transmission stage, which is configured in the manner of a planetary gear (but without an external ring gear). Viewed in the vehicle transverse direction Y, the planetary gear may have a vehicle-external sun gear 47, which is seated in a rotationally fixed manner on a sun gear hollow shaft 48 and a vehicle-internal sun gear 29, which is seated in a rotationally fixed manner on an output-side hub section 30 of a differential housing of axle differential 15. The vehicle-internal sun gear 29 may be in meshing engagement with a vehicle-internal planetary gear 41, while vehicle external sun gear 47 meshes with a vehicle-external planetary gear 45. The two planetary gears 41, 45 may be rotatably mounted on a support bolt 43, as can be seen from FIG. 2.

In the transmission structure of FIG. 1, the vehicle-external sun gear hollow shaft 48 may have a radially expanded clutch flange 50 with a plate carrier. In the same way, respective flange shaft 17, 18 may be configured with a radially expanded clutch flange 51 with a plate carrier. A clutch pack of the multi-plate clutch 7 may be arranged between the plate carriers of the two clutch flanges 50, 51.

Figure 2:
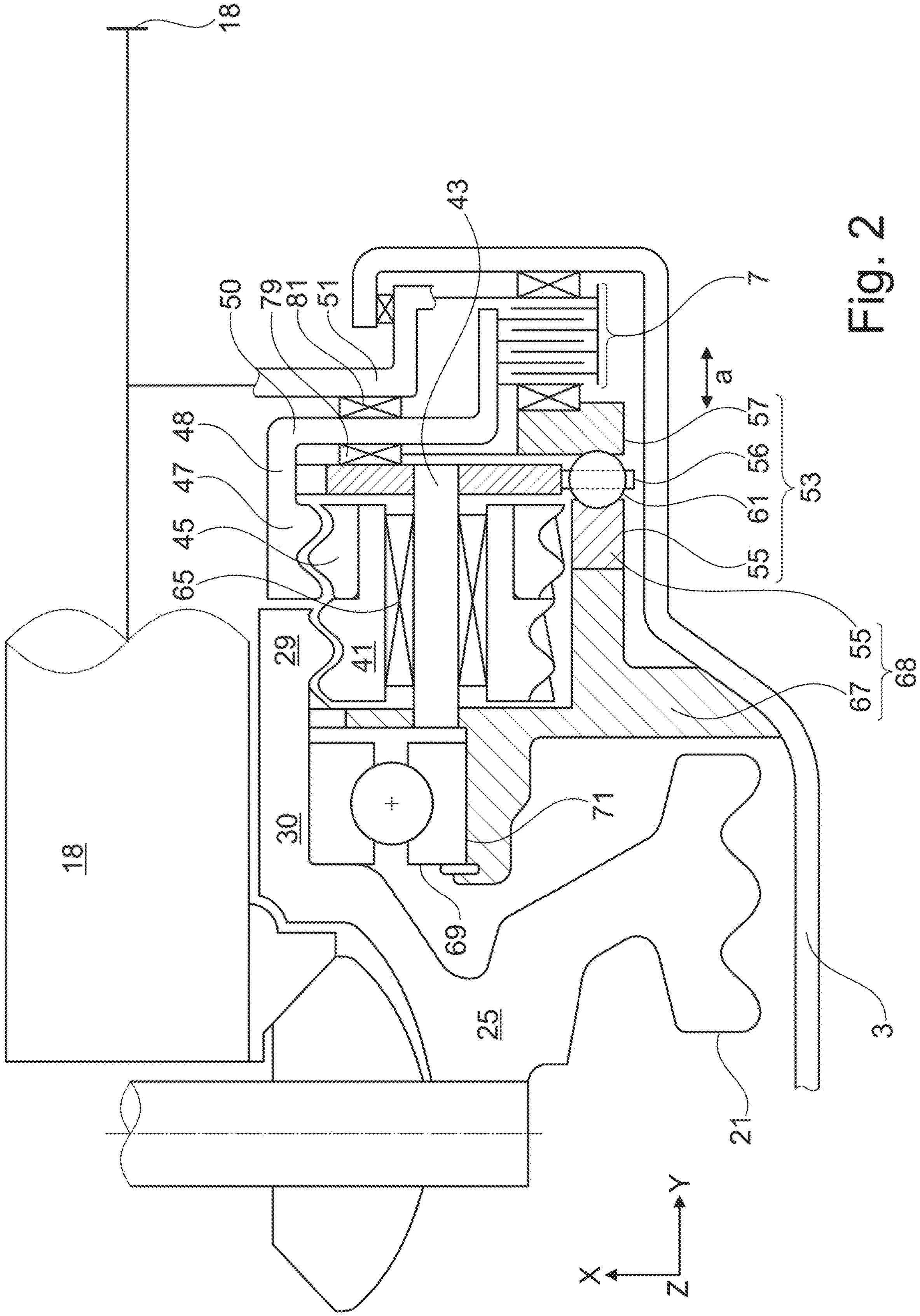
FIG. 2 shows a section view of a transmission structure of the electrified vehicle rear axle of FIG. 1 according to one embodiment.
Figure 4:
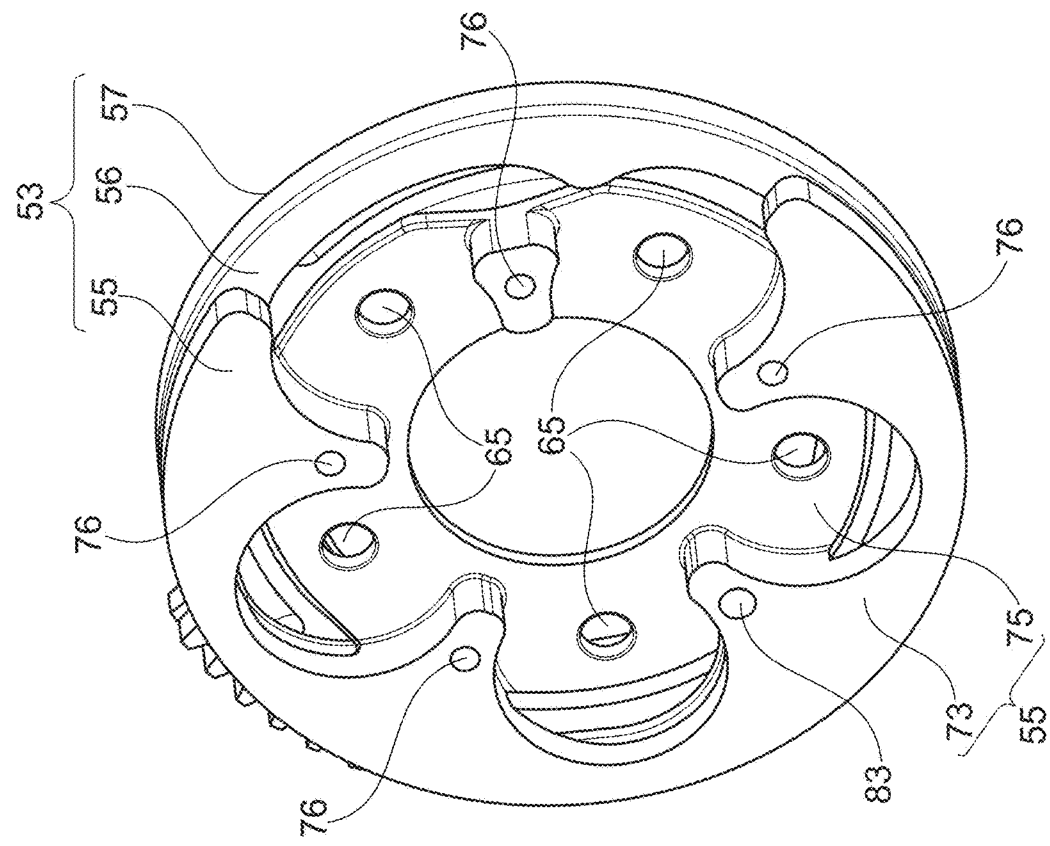
FIG. 4 shows a perspective view of an actuator of a transmission structure of an electric vehicle rear axle according to another embodiment.
Figure 3:
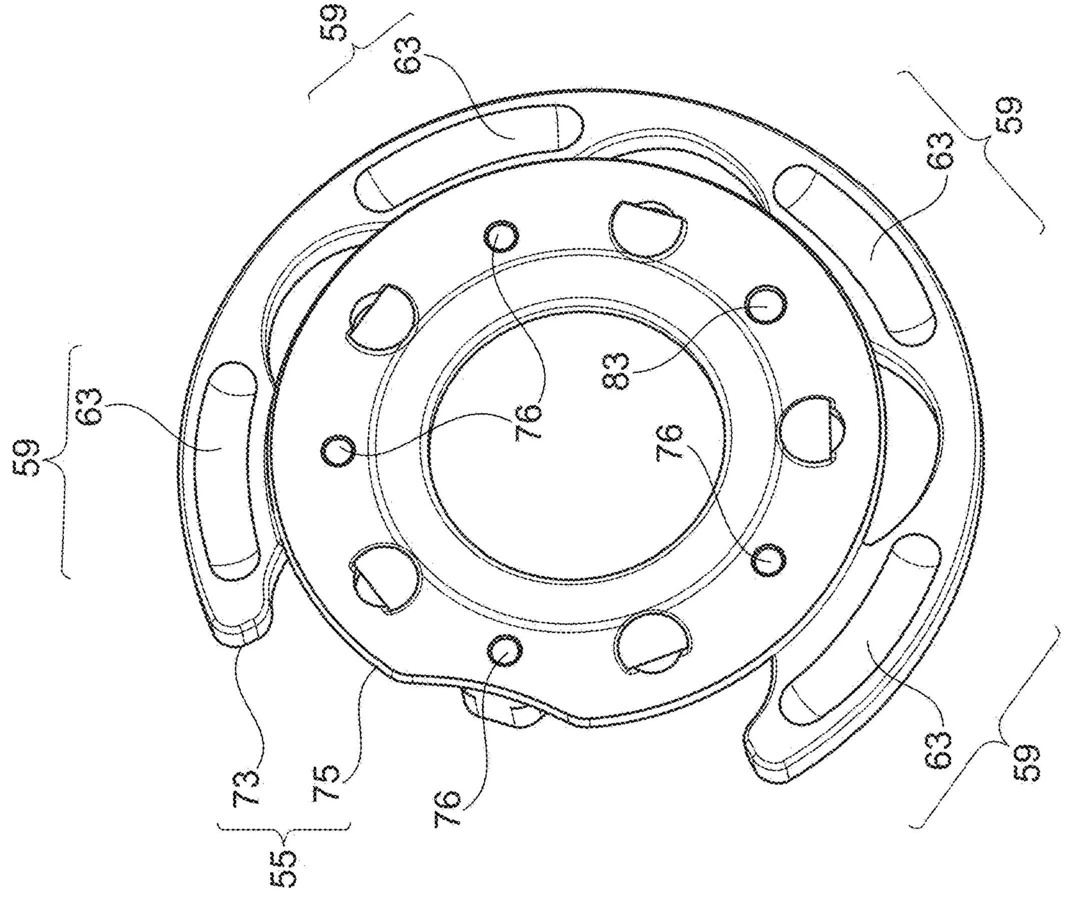
FIG. 3 shows a perspective view of a rotationally fixed disc of an actuator of a transmission structure of an electric vehicle rear axle according to one embodiment.

Each of the multi-plate clutches 7 is associated with an actuator 53, which, according to FIGS. 2 to 4, may be formed from a rotationally fixed disk 55 and a coaxially rotatable disk 57. Between the two disks 55, 57, a total of four ball-ramp units 59 (only indicated in FIG. 3) may be circumferentially distributed, each of which has a ball 61 rolling between mutually inclined ball tracks 63 of the pair of disks. Depending on the direction of rotation of the rotatable disk 57, an axial spreading of the pair of disks may be built up or reduced over an axial spreading distance a (as shown in FIG. 2) in order to apply contact pressure to the clutch pack of multi-plate clutch 7 or to relieve the clutch pack of the multi-plate clutch 7 of this pressure. According to FIG. 4, the rotatable disk 57 may be in driving connection with a spindle drive (not shown) via a gear section formed on the outer circumference.

A key feature of the present disclosure lies in the installation space and structural component reduced design of the vehicle axle shown in FIG. 2. FIG. 2 shows a transmission structure section from the bottom right of FIG. 1. Accordingly, the axle differential 15 is positioned centrally, as viewed in the vehicle transverse direction Y. Next, in the vehicle transverse direction Y to the outside of the vehicle, is superposition gear 28, then the pair of disks of actuator 53, and then multi-plate clutch 7. The pair of disks may have a ball cage 56 between rotationally fixed disk 55 and rotatable disk 57, in which the balls 61 are held.

As shown in FIG. 2, the two planetary gears 41, 45 may be welded to form a double planetary gear, which may be rotatably mounted on support bolt 43 via a pivot bearing 65, such that support bolt 43 defines the axis of rotation of the double planetary gear. According to the present disclosure, in a dual function, rotationally fixed disk 55 of the pair of disks of actuator 53 may also act as a planetary gear carrier. For this purpose, rotationally fixed disk 55 may have a mounting opening 66 (as shown in FIGS. 3 and 4) into which the support bolt 43 is pressed with its right-hand bolt end. The left-hand bolt end of support bolt 43 may be pressed into an end shield 67. Both, end shield 67 and rotationally fixed disk 55 may be fixedly mounted on vehicle axle housing 3 via screw connections (not shown).

According to FIG. 2, rotationally fixed disk 55 and end shield 67 may form a transmission housing 68, in the interior of which the double planetary gear and vehicle-internal and vehicle-external sun gears 29, 47 are arranged. In a dual function, end shield 67 in addition may form a pivot bearing point for hub section 30 of axle differential 15. For this purpose, hub section 30 of axle differential 15 may be mounted in a bearing opening 71 of end shield 67 with the interposition of a pivot bearing 69.

Figure 6:
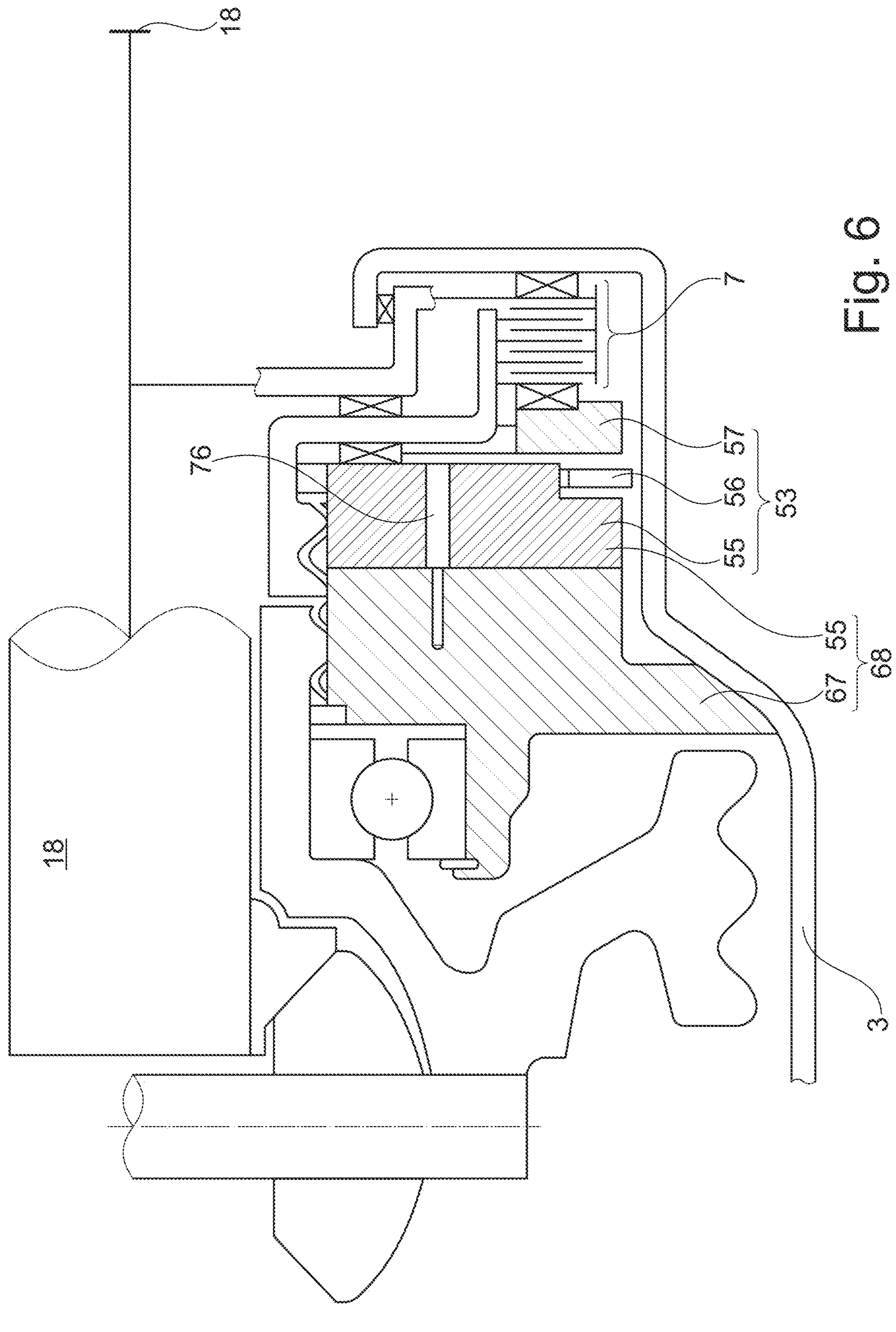
FIG. 6 shows a section of shows a section view of a transmission structure of the electrified vehicle rear axle of FIG. 1 according to another embodiment.

FIGS. 3 and 4 show a specific structure of rotationally fixed disk 55. Accordingly, rotationally fixed disk 55 may have a radially outer ring 73, which is part of ball-ramp units 59. According to FIG. 3, inclined ball tracks 63 of ball-ramp units 59 may be formed on radially outer ring 73. Radially outer ring 73 may transition radially inward into a housing cover 75, on which mounting openings 66 (as shown in FIG. 4) are formed for pressing in the five support bolts 43. Furthermore, housing cover 75 may have screw holes 76 (as shown in FIGS. 3, 4, and 6) for screwing to end shield 67.

Figure 5:
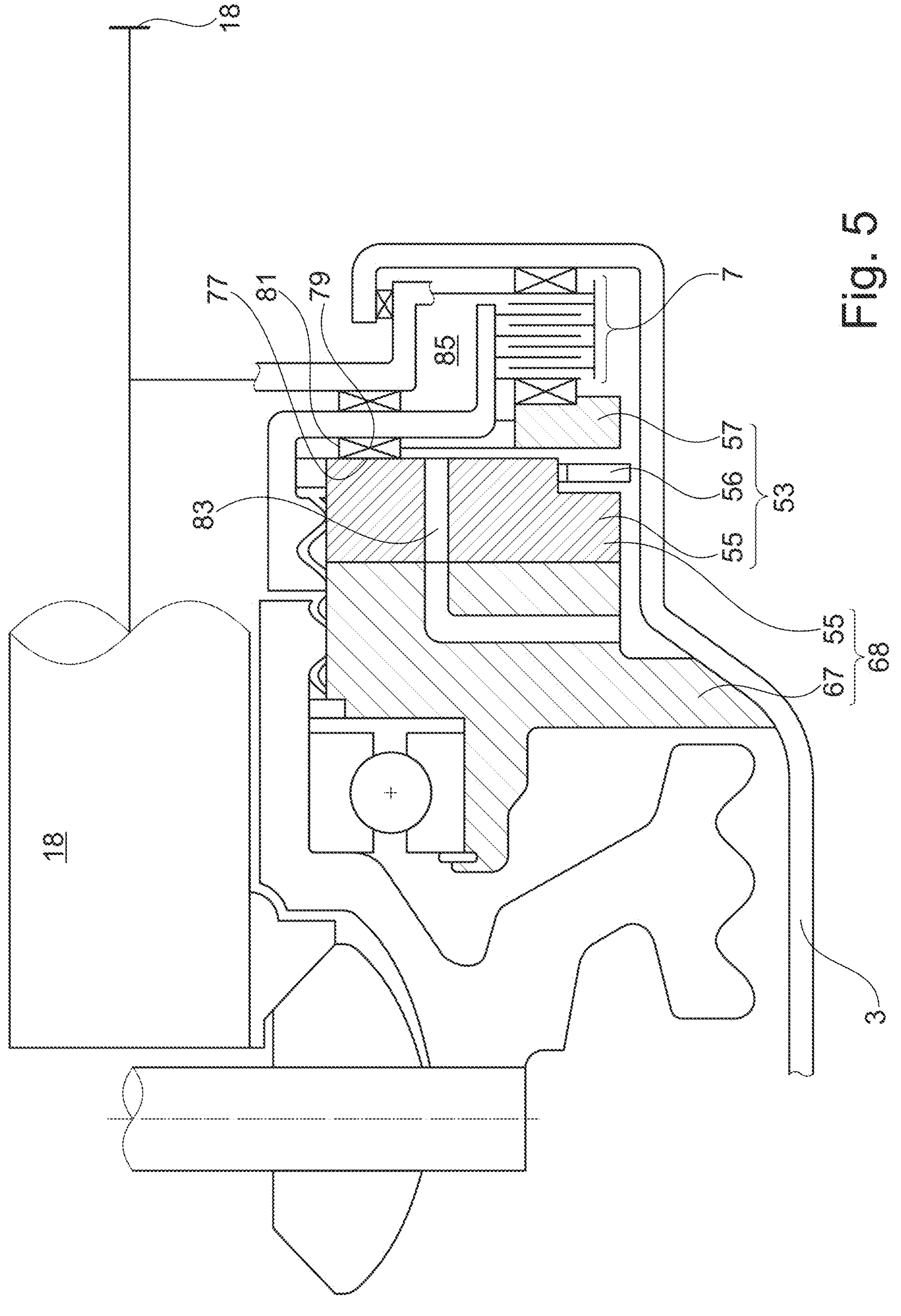
FIG. 5 shows a section of shows a section view of a transmission structure of the electrified vehicle rear axle of FIG. 1 according to another embodiment.

Rotationally fixed disk 55 may additionally be configured to have a rolling element raceway 77 (only indicated in FIG. 5). The rolling element raceway 77 may be part of an axial support bearing 79 (as shown in FIGS. 2 and 5), by way of which coupling flange 50 of the sun gear hollow shaft 48 is supported on rotationally fixed disk 55. Coupling flange 51 of flange shaft 18 may in turn be supported directly on coupling flange 50 by a further axial support bearing 81. The side of rotationally fixed disk 55 axially opposite rolling element raceway 77 may come into sliding contact with an end face of the double planetary gear.

FIG. 5 shows a further extension of functionality of rotationally fixed disk 55. Accordingly, a coolant channel 83 may extend through end shield 67 and through rotationally fixed disk 55. This channel may cross a joining surface between end shield 67 and rotationally fixed disk 55 and opens directly into a distribution chamber 85, which is formed radially inside the clutch pack of multi-plate clutch 7. Coolant channel 83 may be part of a coolant circuit in which coolant is fed into distribution chamber 85 during driving operation. From there, the coolant may be displaced by centrifugal force radially outward through the clutch pack of multi-plate clutch 7.

German patent application no. 102024119453.7, filed Jul. 9, 2024, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A vehicle axle for a two-track vehicle, comprising:

an axle differential, having an input side and two output sides, the input side drivingly connected to a drive unit, and the two output sides each including a drive flange shaft leading to a respective vehicle wheel; and at least two superposition gears for torque vectoring, each superposition gear of the at least two superposition gears being configured as a planetary gear and having a multi-plate brake or clutch, each multi-plate brake or clutch having an actuator, each actuator being a pressure mechanism and configured as a pair of disks comprising a rotationally fixed disk and a coaxially rotatable disk, wherein each drive flange shaft is configured to interact with a respective superposition gear of the at least two superposition gears, and wherein the rotationally fixed disk of each actuator forms a respective gear carrier on which at least one gear of the respective superposition gear is rotatably mounted.

2. The vehicle axle according to claim 1, wherein a respective axis of rotation of each of the at least one gear is defined by a respective support bolt, each support bolt having one bolt end attached to the rotationally fixed disk of the respective pressure mechanism.

3. The vehicle axle according to claim 2, wherein each superposition gear includes:

a vehicle-external sun gear configured as a loose gear wheel and seated on the respective drive flange shaft;

a vehicle-internal sun gear seated in a rotationally fixed manner on an output-side hub section of a differential housing of the axle differential, the respective drive flange shaft extending through the output-side hub section of the differential housing of the axle differential; and the respective support bolt, on which a vehicle-internal planetary gear meshing with the vehicle-internal sun gear and a vehicle-external planetary gear meshing with the vehicle-external sun gear are rotatably mounted.

4. The vehicle axle according to claim 3, wherein the vehicle-internal planetary gear meshing with the vehicle-internal sun gear and the vehicle-external planetary gear meshing with the vehicle-external sun gear are configured to be joined together as a double planetary gear, and/or wherein the vehicle-external sun gear is configured to be coupled to the drive flange shaft via the respective multi-plate brake or clutch in a torque-transmitting manner.

5. The vehicle axle according to claim 4, wherein the double planetary gear rotatably mounted on the respective support bolt is positioned inside the vehicle and the respective multi-plate brake or clutch is positioned outside the vehicle.

6. The vehicle axle according to claim 5, wherein the pressure mechanism is arranged between the double planetary gear and the respective multi-plate brake or clutch.

7. The vehicle axle according to claim 3, wherein the vehicle-external sun gear is seated in a rotationally fixed manner on a sun gear hollow shaft through which the respective drive flange shaft extends, and wherein the sun gear hollow shaft has a radially expanded hollow shaft coupling flange with a plate carrier, and wherein the respective drive flange shaft has a radially expanded flange shaft coupling flange with a plate carrier, and wherein a clutch pack of the respective multi-plate brake or clutch is arranged between the plate carrier of the hollow shaft coupling flange and the plate carrier of the flange shaft coupling flange, and is configured to be subjected to or relieved of contact pressure by way of the coaxially rotatable disk of the pressure mechanism, and/or wherein the rotationally fixed disk has a rolling element raceway forming an axial support bearing, and one of the hollow shaft coupling flange and the flange shaft coupling flange is supported on the rotationally fixed disk.

8. The vehicle axle according to claim 2, wherein an opposing end of the respective support bolt relative to the one bolt end of the respective support bolt is attached to a respective end shield.

9. The vehicle axle according to claim 1, further comprising a vehicle axle housing in which the axle differential and the at least two superposition gears are arranged.

10. The vehicle axle according to claim 9, wherein:

an end shield is fixedly attached to the vehicle axle housing; and/or the end shield is configured to form a pivot bearing point for a hub section of the axle differential, wherein the hub section is mounted in a bearing opening of the end shield with the interposition of a pivot bearing; and/or the end shield and the rotationally fixed disk of the pressure mechanism are firmly connected to one another by way of a screw connection.

11. The vehicle axle according to claim 1, wherein the pressure mechanism has at least one ball-ramp unit with a ball configured to roll between mutually inclined ball tracks of the pair of disks, wherein when the rotatable disk rotates in a first direction, an axial spreading of the pair of disks along an axial spreading distance increases such that contact pressure is applied to respective the multi-plate brake or clutch, and wherein when the rotatable disk rotates in an opposite direction, the axial spreading of the pair of disks along an axial spreading distance decreases, such that the respective multi-plate brake or clutch is relieved of contact pressure.

12. The vehicle axle according to claim 11, wherein the rotationally fixed disk has a radially outer ring, which is part of the ball-ramp unit, and the radially outer ring transitions radially inward into a housing cover to which a support bolt is attached, and/or the housing cover of the rotationally fixed disk is attached to an end shield by way of a screw connection.

13. The vehicle axle according to claim 1, wherein a coolant channel extends through an end shield and through the rotationally fixed disk of a respective pressure mechanism and crosses a joining surface between the end shield and the rotationally fixed disk.

14. The vehicle axle according to claim 13, wherein the coolant channel opens into a distribution chamber formed radially inside a clutch pack of the respective multi-plate brake or clutch.

15. The vehicle axle according to claim 14, wherein the coolant channel is configured to displace coolant by centrifugal force radially outward from the distribution chamber through the clutch pack.

16. The vehicle axle according to claim 1, wherein the rotationally fixed disk of each actuator forms a planetary gear carrier.

17. The vehicle axle according to claim 16, wherein the planetary gear of each superposition gear is rotatably mounted on the planetary gear carrier of the rotationally fixed disk of the respective actuator.

18. The vehicle axle according to claim 1, wherein each of the at least two superposition gears are arranged in a gear housing.

19. The vehicle axle according to claim 18, wherein the gear housing comprises the rotationally fixed disk and an end shield.

* * * * *